United States Patent [19]
Morgan et al.

[11] Patent Number: 5,440,721
[45] Date of Patent: Aug. 8, 1995

[54] METHOD AND APPARATUS FOR CONTROLLING SIGNAL TIMING OF CASCADED SIGNAL PROCESSING UNITS

[75] Inventors: O. F. Morgan, San Jose; Michael Polatnick, Oakland; Andrew Leary, Palo Alto, all of Calif.

[73] Assignee: Sony Electronics, Inc., Park Ridge, N.J.

[21] Appl. No.: 856,580

[22] Filed: Mar. 24, 1992

[51] Int. Cl.6 .......................... G06F 7/38; G06F 12/00
[52] U.S. Cl. ....................... 395/550; 364/736; 364/724.16; 364/281.7; 364/230.3; 364/238.3; 364/DIG. 1; 327/270; 348/409; 348/415
[58] Field of Search ............. 395/530, 725, 550; 364/736, 724.16; 358/136

[56] References Cited

U.S. PATENT DOCUMENTS

| | | | |
|---|---|---|---|
| 3,700,866 | 10/1972 | Taylor | 235/150.1 |
| 4,287,596 | 9/1981 | Chari | 375/49 |
| 4,482,826 | 11/1984 | Ems et al. | 307/602 |
| 4,797,740 | 1/1989 | Harasaki et al. | 358/136 |
| 4,835,725 | 5/1989 | Yassaie et al. | 364/736 |
| 5,022,090 | 6/1991 | Masaki et al. | 382/49 |
| 5,081,604 | 1/1992 | Tanaka | 364/724.16 |
| 5,155,852 | 10/1992 | Murakami et al. | 395/725 |

Primary Examiner—Kevin A. Kriess
Assistant Examiner—Majid A. Banankhah
Attorney, Agent, or Firm—Irell & Manella

[57] ABSTRACT

Each of the signal processing units of a digital signal processing system is provided with a programmable timing delay unit having identical programming interface to control the signal timing of its signal processing circuitry. Additionally, a central timing unit is provided to the digital signal processing system to provide signal timing control inputs to the programmable timing delay units. Furthermore, a routing switcher is provided to the digital signal processing system to control configuration of the signal path, i.e. the order in which the signal is processed by all or a subset of the signal processing units of the digital signal processing system. As a result, the individual signal processing units are relieved the burden of providing circuitry for timing control, delay equalization and timing derivation. Furthermore, the timing offsets for the individual signal processing units may be easily recomputed for any signal path, thereby improving the reconfiguration flexibility of the digital signal processing system.

22 Claims, 11 Drawing Sheets

METHOD AND APPARATUS FOR CONTROLLING SIGNAL TIMING OF CASCADED SIGNAL PROCESSING UNITS

BACKGROUND OF THE INVENTION

1. Field of the Invention

The present invention relates to the field of digital signal processing systems, in particular, digital signal processing systems comprising cascaded signal processing units. More specifically, the present invention relates to controlling signal timing for the cascaded signal processing units.

2. Background

In a digital signal processing system, digitized signals are often processed serially by a number of digital signal processing units in a cascaded manner. Within each digitized signal processing unit, as the digitized signals undergo processing, certain amount of timing delays are usually incurred. The delays may be inherent, due to the construction or process of the unit, or preprogrammed. In order for the eventual output to be generated in a fixed, predetermined timing relationship relative to an external reference, signal timing in the signal processing units must be advanced in a coordinated manner. Traditionally, each signal processing unit provides its own circuitry for timing control, delay equalization, and timing derivation; and the signal path is predetermined.

Typically, each signal processing unit provides a "Genlock" circuit to control the timing of its signal generator. A "Genlock" circuit takes an external reference signal and regenerates the signal being processed with a timing advance to compensate for delays in signal processing and propagation. Typically, each signal processing unit also provides its own local memory for equalization of signal delays. For digital signal processing systems whose reference signals are composite reference signals of various timing components, for example, video systems, where reference signals are usually composite signals of the horizontal, vertical, and frame timings, typically each signal processing unit also provides its own "Sync Separator" circuits to derive the various timing components.

These traditional approaches are not very cost effective, since the individual signal processing units have the burden of providing their own circuitry for timing control, delay equalization and timing derivation. In particular, having more than one signal processing units deriving the timing components from a composite reference signal is very costly, since reliable and accurate derivation of timing components from a composite reference signal can be very complex.

Additionally, these digital signal processing systems typically have limited flexibility in reconfiguring their signal paths. Reconfiguration is possible only if the individual signal processing units are padded with additional fixed delays. Even then, reconfiguration is limited to those changes involving simple delays, such as frame delays in a video system.

Thus, it is desirable to have an approach to control the signal timing of cascaded signal processing units of a digital signal processing system where the individual signal processing units do not have the complete burden of providing their own circuitry for timing control, delay equalization and timing derivation. Furthermore, it is desirable if the approach can provide improved flexibility in reconfiguring the signal path.

As will be disclosed, these desired objects and results are among the objects and results achieved by the method and apparatus of the present invention for controlling signal timing of reconfigurable cascaded signal processing units in a digital signal processing system.

SUMMARY OF THE INVENTION

A method and apparatus for controlling signal timing of cascaded signal processing units of a digital signal processing system is disclosed. The method and apparatus of the present invention has particular applications to digital signal processing systems that generate output signals in fixed, predetermined timing relationship to a reference signal, in particular, digital video and audio systems.

Under the presently preferred embodiment, each of the signal processing units of a digital signal processing system is provided with a programmable timing delay unit having identical programming interface to control the signal timing of its signal processing circuitry. Additionally, a central timing unit is provided to the digital signal processing system to provide signal timing control inputs to the programmable timing delay units. Furthermore, a routing switcher is provided to the digital signal processing system to control configuration of the signal path, i.e. the order in which the signal is processed by all or a subset of the signal processing units of the digital signal processing system.

In their presently preferred form, each of the programmable timing delay units comprises a plurality of timing offset register and counter pairs and a plurality of processing delay registers, one of each for each timing component of a composite reference signal. Each of the timing offset register and counter pairs of a programmable timing delay unit advances and controls the signal timing of a timing component for the corresponding signal processing circuitry. Each of the processing delay registers of a programmable timing delay unit stores the processing delay of a timing component of the corresponding signal processing circuitry for the central timing unit or the signal processing circuitry, depending on the type of signal processing unit.

Additionally, if the signal processing unit is a signal synchronizer comprising a dual ported memory for synchronizing a signal presented to the digital signal processing system in known timing relationship to a composite reference signal, the programmable timing delay unit further comprises a plurality of processing delay counters corresponding to the processing delay registers, and a plurality of output counters, one of each for each timing component of the composite reference signal. The timing offset register and counter pairs provide write addresses to the dual ported memory with appropriate timing advances, and the processing delay register and counter pairs, in conjunction with the output counters, provide read addresses to the dual ported memory with appropriate timing advances.

Furthermore, if the signal processing unit is an input synchronizer comprising a dual ported memory and a sync separator circuit for synchronizing a signal presented to the digital signal processing system in unknown timing relationship to a composite reference signal, in its presently preferred form, the programmable timing delay unit further comprises a plurality of input counters, one for each timing component of the composite reference signal. The input counters provide write addresses to the dual ported memory with appropriate timing advances, and the timing offset register and counter pairs provide read addresses to the dual ported memory with appropriate timing advances. Additionally, the input counters, in conjunction with the offset register and counter pairs, stores the processing delays in the delay registers for the central timing unit.

In its presently preferred form, the central timing unit comprises a reference signal detector and distributor pair, and a timing offset generation unit. The timing offset generation unit comprises a processor and an input device. The reference signal detector and distributor pair decomposes a composite reference signal and distributes the decomposed reference signal, along with clock pulses, to the programmable timing delay units. The processor computes the timing offset of each timing component for each of the signal processing units, and provides the computed timing offsets to the corresponding programmable timing delay units. Additionally, if the signal path contains a signal synchronizer, the processor first computes the processing delay of the signal synchronizer before computing and providing the timing offsets to the individual signal processing units. Likewise, if the signal path contains an input synchronizer, the processor first computes the total system delay before computing and providing the timing offsets to the individual signal processing units.

As a result, the individual signal processing units are relieved of the burden of providing circuitry for timing control, delay equalization and timing derivation. Furthermore, the timing offsets for the individual signal processing units may be easily recomputed for any signal path, thereby improving the reconfiguration flexibility of the digital signal processing system.

BRIEF DESCRIPTION OF THE DRAWINGS

The objects, features, and advantages of the present invention will be apparent from the following detailed description of the preferred embodiment of the invention with references to the drawings in which.

DETAILED DESCRIPTION PRESENTLY PREFERRED AND ALTERNATE EMBODIMENTS

A method and apparatus for controlling signal timing of cascaded signal processing units in a digital signal processing system is disclosed. The method and apparatus of the present invention has particular applications to digital signal processing systems that generate output signals in fixed, predetermined timing relationship to a reference signal, in particular, digital video and audio systems.

In the following description, for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
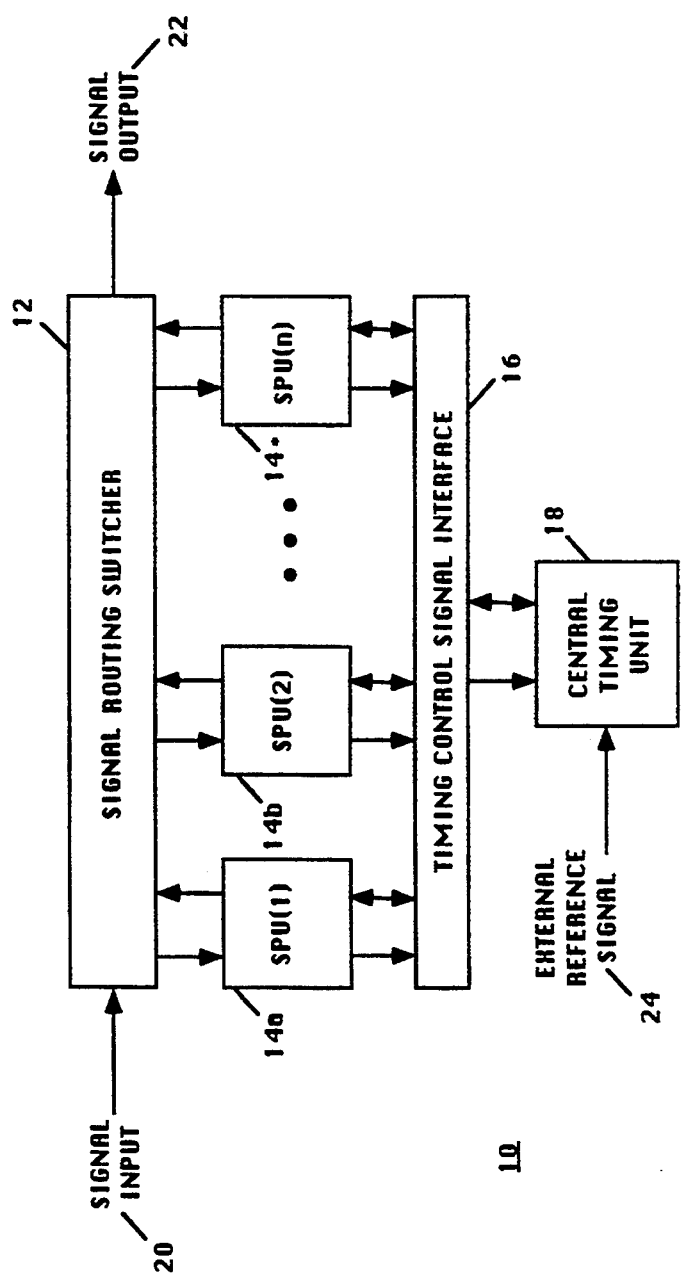
FIG. 1 shows a system view of a digital signal processing system that incorporates the teachings of the present invention.

Referring now to FIG. 1, a block diagram illustrating a digital signal processing system that incorporates the teachings of the present invention is shown. Shown is a digital signal processing system 10 for processing a digital signal 20 and generating a processed digital signal 22 in a fixed, predetermined timing relationship relative to an external reference signal 24. The digital signal processing system 10 comprises a signal routing switcher 12, a plurality of signal processing units 14a–14*, a timing control signal interface 16, and a central timing unit 18. The signal processing units 14a–14* are coupled to the signal routing switcher 12 and the timing control signal interface 16. The timing control signal interface 16 in turn is coupled to the central timing unit 18. Except for the teachings of the present invention incorporated, the digital signal processing system 10 is intended to represent a broad category of well known digital signal processing systems, such as a digital video system or a digital audio system.

The input signal 20 is propagated and serially processed by one or more of the signal processing units 14a–14* to generate the output signal 22 with the required timing relationship to the reference signal 24. The number and order of the signal processing units 14a–14* involved are controlled by the signal routing switcher 12. The signal timing within each of the signal processing units 14a–14* involved is controlled in accordance to the timing control inputs received from the central timing unit 18 through the timing control signal interface 16. The timing control inputs are provided by the central timing unit 18 based on the external reference signal 24 received, the signal path, and the processing delay within each of the signal processing units 14a–14* involved. Each of the elements, 12, 14a–14*, 16, and 18, and the manner in which they cooperate to generate the output signal 22 with the required timing relationship to the reference signal 24 will be described in further detail below.

For the purpose of illustrating the present invention, the external reference signal is assumed to be a composite reference signal comprising a plurality of timing components. For example, if the digital signal processing system is a digital video system, the composite external reference signal 22 may comprise a horizontal timing component, a vertical timing component and a frame timing component.

Continuing to refer to FIG. 1, the signal path configured by the signal routing switcher 12 is either known or made known to the central timing unit 18. In the embodiment shown in FIG. 1, the signal routing switcher 12 is not connected to the central timing unit 18; the signal path is provided to the central timing unit 18 by an external knowledgeable source. In an alternate embodiment, the signal routing switcher 12 may be coupled to the central timing unit 18 and provides the signal path to the central timing unit 18 directly. In another alternate embodiment, the signal routing switcher 12 may be coupled to and operated under the control of the central timing unit 18. In any case, the signal routing switcher 12 is intended to represent a broad category of well known routing switchers, and will not be described further.

Figure 2:
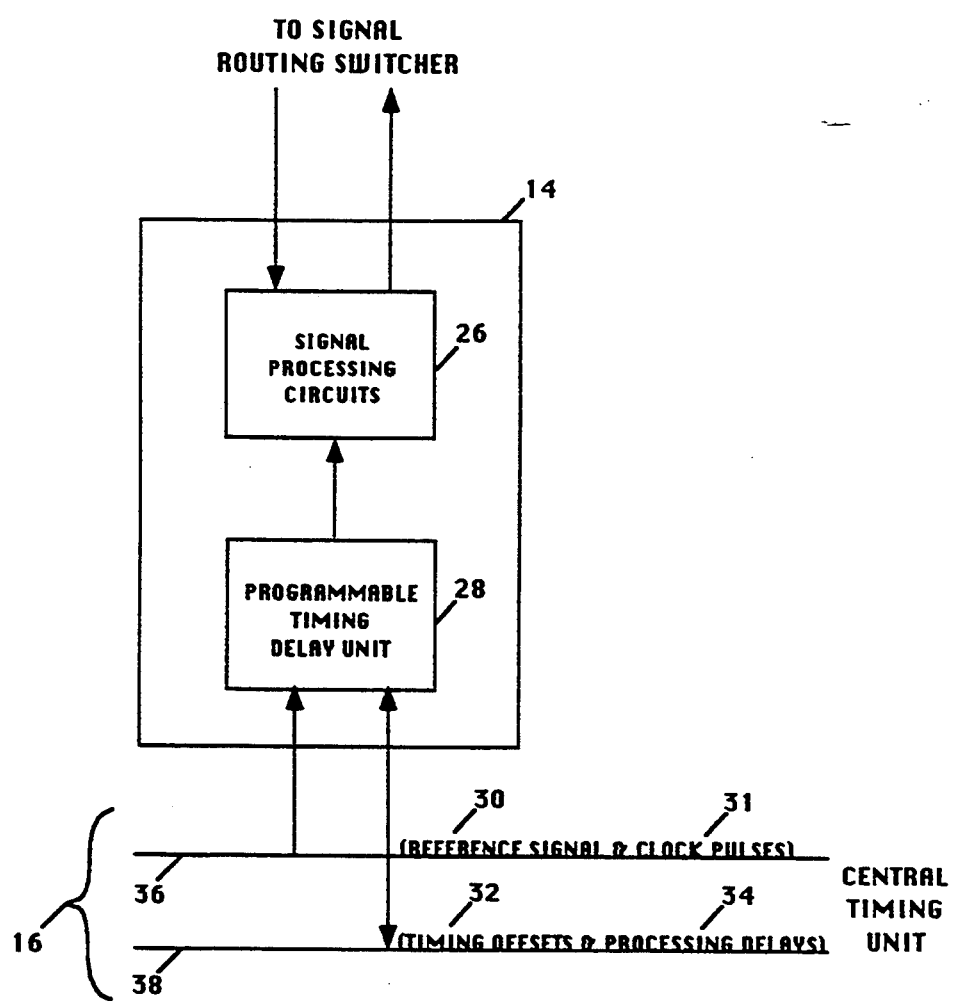
FIG. 2 shows a component view of a signal processing unit and the timing control signal interface of the digital signal processing system illustrated in FIG. 1.

Referring now to FIG. 2, a block diagram illustrating a signal processing unit and the timing control signal interface is shown. Shown is a signal processing unit 14 that is representative of the signal processing units illustrated in FIG. 1. The signal processing unit 14 comprises signal processing circuits 26, and a programmable timing delay unit 28. The signal processing circuits 26 are coupled to the signal routing switcher and the programmable timing delay unit 28. The programmable timing delay unit 28 is in turn coupled to the timing control signal interface 16. Except for the programmable timing delay unit 28 incorporated, the signal processing unit 14 is intended to represent a broad category of well known signal processing units including signal synchronizer units and input synchronizer units. A signal synchronizer unit is used in applications where the input signal is presented to the digital processing system in known timing relationship to the external reference signal. An input synchronizer is used in applications where the input signal is presented to the digital processing system in unknown timing relationship to the external reference signal, the input signal having its own synchronization pulses.

The signal processing circuits 26 receive the input signal from the signal routing switcher, process the received signal, and return the processed signal to the signal routing switcher. The signal timing within the signal processing circuits 26 is controlled by the programmable timing delay unit 28. The programmable timing delay unit 28 controls the signal timing of the signal processing circuits 26 in accordance to the timing control inputs received from the central timing unit through the timing control signal interface 16.

The particular functions provided and the constitution of the signal processing circuits 26 are application dependent. The signal processing circuits 26 are intended to represent a broad category of signal processing circuits of well known signal processing units including signal synchronizer units and input synchronizer units. Except for the two cases where the signal processing unit 14 is a signal synchronizer unit or an input synchronizer unit, the signal processing circuits 26 will not be described further. Two particular embodiments of the signal processing circuits 26, one for a signal synchronizer and one for an input synchronizer will be described in further detail later with references to FIGS. 4 and 5 respectively.

The timing control inputs received by the programmable timing delay unit 28 from the central timing unit through the timing control signal interface 16 comprise the reference signal 30, clock pulses 31, and at least one timing offset 32. The programmable timing delay unit 28 uses the reference signal 30, the clock pulses 31 and the timing offsets 32 to advance and control the signal timing within the signal processing circuits 26. Additionally, the programmable timing delay unit 28 is selectively used to provide the processing delays 34 to the central timing unit or the signal processing circuits 36, depending on the type of signal processing unit 14.

The reference signal 30 received by the programmable timing unit 28 is a decomposed reference signal with its timing components delineated. The timing offsets 32 received by the programmable timing delay unit 28 comprise one timing offset for each of the timing components. That is, for a composite reference signal on a video system having a horizontal, vertical and frame timing component, the timing offsets comprise a corresponding horizontal, vertical, frame timing offset.

While the programmable timing delay units, e.g. 28, in the signal processing units, e.g. 14, are not identical, they are similar and all have the same programming interface. However, it will be appreciated that the present invention may be practiced without the programmable timing delay units, e.g. 28, having the same programming interface. The programmable timing delay unit 28 will be described in further detail below with references to FIGS. 3–5. The central timing unit and the methods employed for timing offset determination will be described in further detail below with references to FIGS. 6–9.

Still referring to FIG. 2, the timing control signal interface 16 comprises a reference interface 36, and a data interface 38. Both interfaces couple the programmable timing delay units, e.g. 28, to the central timing unit. The reference interface 36 transports the decomposed reference signal 30, and the clock pulses from the central timing unit to the programmable timing delay units, e.g. 28. The data interface 38 transports timing offsets 32 from the central timing unit to the programmable timing delay units, e.g. 28, and processing delays 34 between the central timing unit and the programmable timing delay units, e.g. 28. These two interfaces 36 and 38 are intended to represent a broad category of well known communication interfaces, and will not be described further. Additionally, it will be appreciated that the present invention may be practiced without the reference signal and clock pulses, nor the timing offsets and the processing delays, transported on the same interface.

Figure 3:
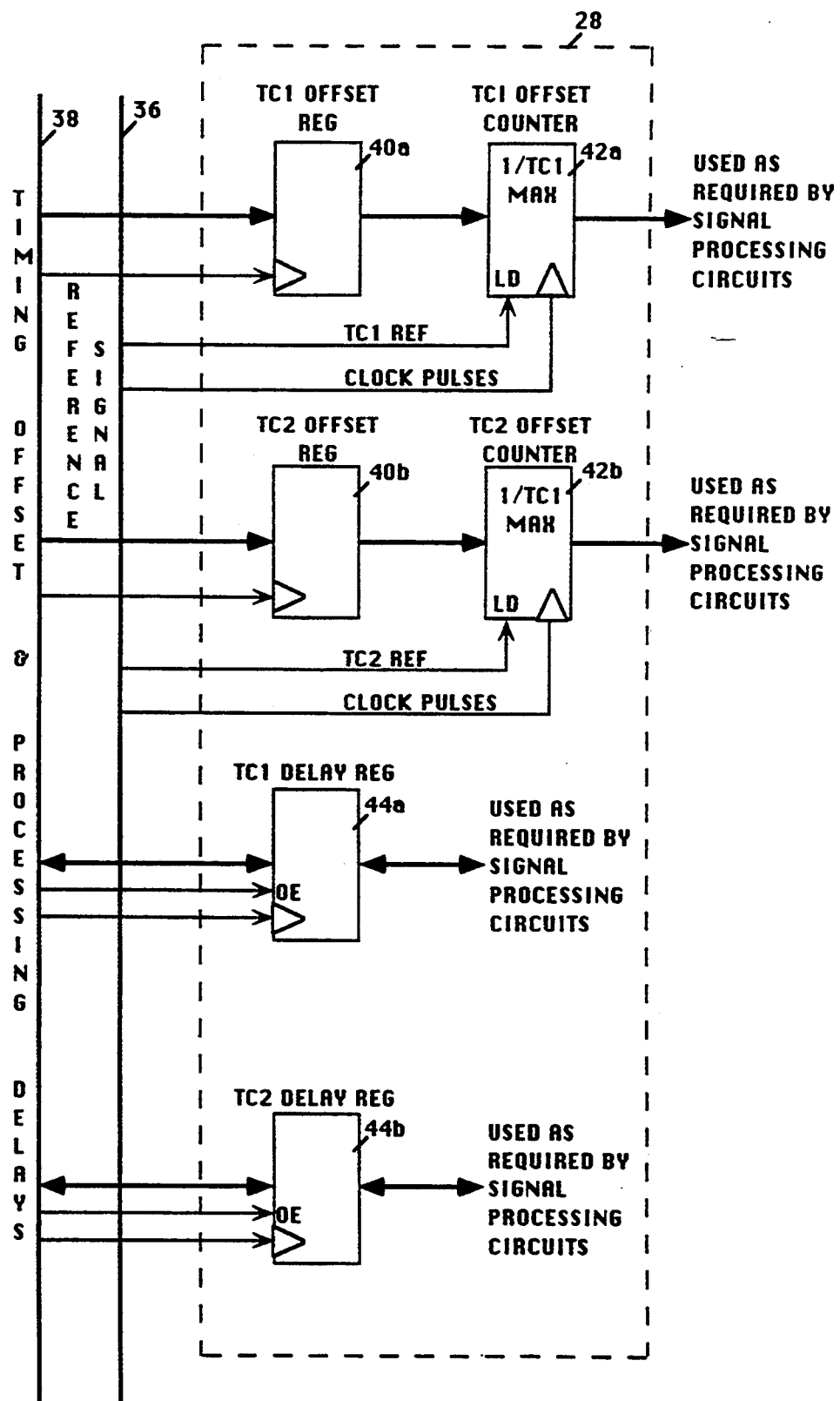
FIG. 3 shows a component view of the basic embodiment of the programmable timing delay unit of the present invention for a signal processing unit of a digital signal processing system whose composite reference signal has two timing components.
Figure 4:
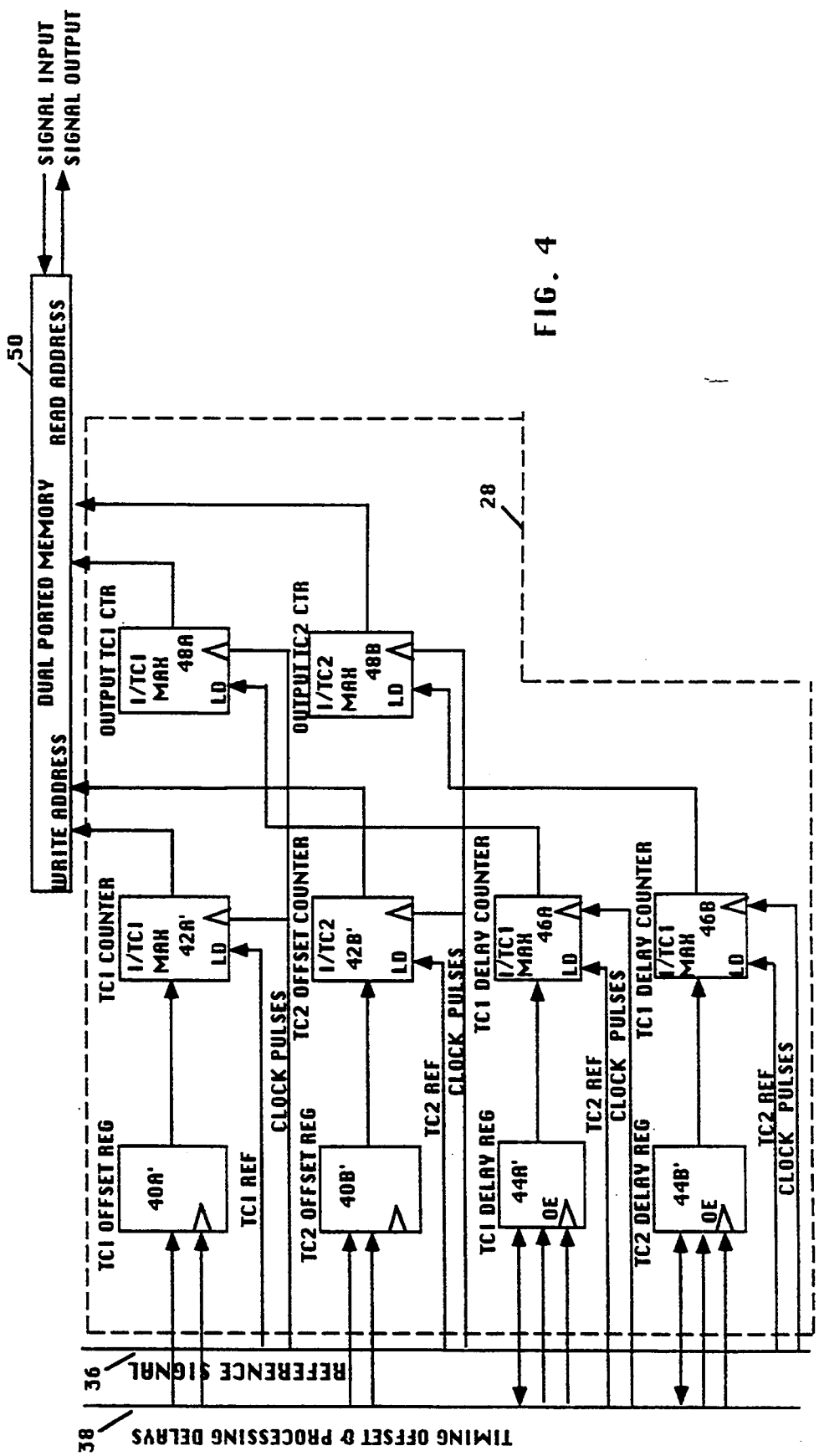
FIG. 4 shows a component view of one modified embodiment of the programmable timing delay unit of the present invention for a signal synchronizer unit of a digital signal processing system whose composite reference signal has two timing components.
Figure 5:
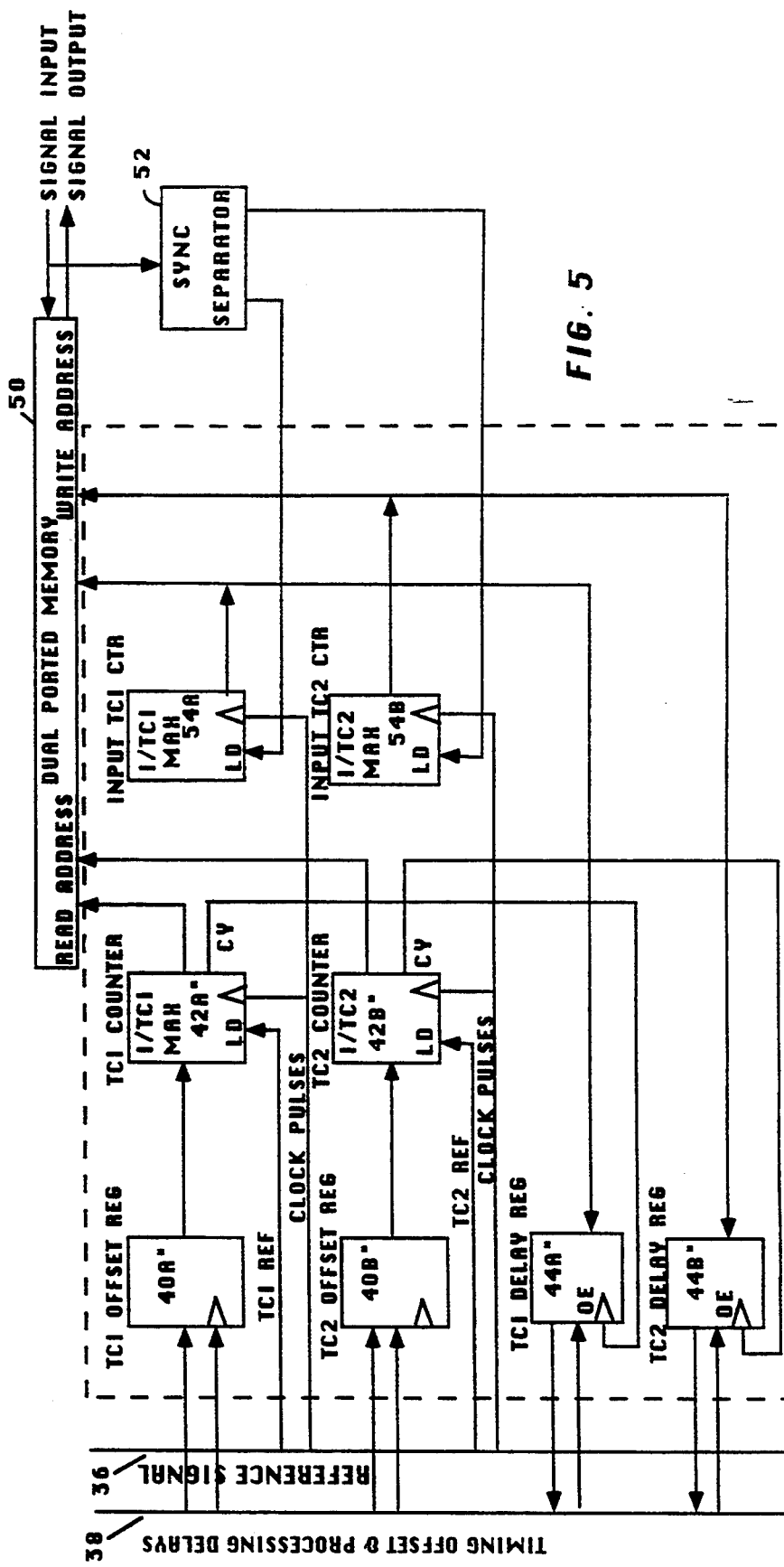
FIG. 5 shows a component view of another modified embodiment of the programmable timing delay unit of the present invention for an input synchronizer unit of a digital signal processing system whose composite reference signal has two timing components.

Referring now to FIGS. 3–5, three block diagrams illustrating the programmable timing delay units for signal processing units of a digital signal processing system generating output signals in reference to a composite reference signal having two timing components are shown. FIG. 3 illustrates the basic programmable timing delay unit to be used with most signal processing units. FIGS. 4 and 5 illustrate two modified programmable timing delay units to be used with a signal synchronizer unit and an input synchronizer unit respectively. It will be appreciated that these programmable timing delay units may be modified for simple reference signals having only one timing component or more complex composite reference signals having more than two timing components.

Shown in FIG. 3 is a programmable timing delay unit 28 comprising two offset register and counter pairs, 40a and 42a, 40b and 42b, and two delay registers, 44a and 44b. The offset counters, 42a and 42b, are coupled to the signal processing circuits, the offset registers, 40a and 40b, and the reference interface 36. The offset registers, 40a and 40b, are in turn coupled to the data interface 38. The delay registers, 44a, and 44b, are coupled to the signal processing circuits and the data interface 38.

The offset register and counter pairs, 40a and 42a, 40b and 42b, provide timing controls to the signal processing circuit with the appropriate timing advances. Offset register and counter pair, 40a and 42a, deals with the first timing component, and offset register and counter pair, 40b and 42b, deals with the second timing component. The offset registers, 40a and 40b, store the timing offsets provided by the central timing unit for the first and second timing component respectively. The corresponding offset counters, 42a and 42b, load the stored first and second timing offsets upon detecting the corresponding load pulses for the first and second timing component, and count up to the maximum count for the respective timing components. Upon reaching the maximum for its timing component, the offset counter, 42a or 42b, generates a carry output for its timing component for the signal processing circuit, and recommences counting from zero.

For example, for a video system generating output signal in reference to a composite signal having a horizontal and a vertical timing component, one offset register stores the horizontal offset and the other offset register stores the vertical offset. The corresponding horizontal and vertical offset counters load the stored horizontal and vertical offsets upon detecting the respective load pulses for the horizontal and vertical timing components, and count correspondingly up to the maximum of the respective timing components. Upon reaching the maximum of the horizontal or the vertical timing component, the corresponding horizontal or vertical offset counter generates a carry output for the horizontal or vertical component for the signal processing circuit and recommences counting from zero.

The processing delay registers, 44a and 44b, store the processing delays of the signal processing unit provided by either the central timing unit or the signal processing circuits for the first and second timing component respectively. Delay register 44a, is for the first timing component, and delay register 44b, is for the second timing component. Whether the processing delays are provided by the central timing unit or the signal processing circuits depend on the type of signal processing unit. As described earlier, processing delays are used in conjunction with the reference signal and the signal path by the central timing unit to determine the timing offsets for the signal processing units. The usage of the processing delays by the signal processing circuits is application dependent.

Shown in FIG. 4 is a modified programmable timing delay unit 28' for a signal synchronizer unit. The signal processing circuits for the signal synchronizer unit comprise a dual ported memory 50. The programmable timing delay unit 28' comprises two offset register and counter pairs, 40a' and 42a', 40b' and 42b', two delay register and counter pairs, 44a' and 44b', 46a and 46b, and two output counters, 48a and 48b. The offset counters, 42a' and 42b', are coupled to the dual ported memory 50, the offset registers, 40a' and 40b', and the reference interface 36. The offset registers, 40a' and 40b', are in turn coupled to the data interface 38. The output counters, 48a and 48b, are coupled to the dual ported memory 50, the delay counters, 46a and 46b, and the reference interface 36. The delay counters, 46a and 46b, are in turn coupled to the delay registers, 44a' and 44b', and the reference interface 36. The delay registers, 44a', and 44b', are in turn coupled to the data interface 38.

The offset register and counter pairs, 40a' and 42a', 40b' and 42b', provide write addresses to the dual ported memory 50 with the appropriate timing advances. The offset register and counter pairs, 40a' and 42a', 40b' and 42b', operate in the same manner as previously described for the basic programmable timing delay unit.

The delay registers, 44a' and 44b', store processing delays of the signal synchronizer provided by the central timing unit. Additionally, the delay registers, 44a' and 44b', in conjunction with the corresponding delay counters, 46a and 46b, and the corresponding output counters, 48a and 48b, provide read addresses to the dual ported memory 50 with the appropriate timing advances. Similarly, the delay counter 46a and the output counter 48a deal with the first timing component; the delay counter 46b and the output counter 48b deal with the second timing component. The corresponding delay counters, 46a and 46b, load the stored first and second processing delay upon detecting the corresponding load pulses for the first and second timing component, and count down to the zero. Upon reaching zero, the delay counter, 46a or 46b, generates a carry output for its timing component for the corresponding output counter, 48a or 48b, and recommences counting down from the maximum count of its respective timing component. The corresponding output counters, 48a and 48b, count up to the maximum of their respective timing components upon receiving the carry outputs from their corresponding delay counters, 46a and 46b. Upon reaching the maximum of its timing component, the output counter, 48a or 48b, recommences counting from zero. The output counters 48a and 48b provide read addresses to the dual ported memory 50.

For example, for a video system generating output signal in reference to a composite signal having a horizontal and a vertical timing component, one delay register stores the horizontal processing delay provided by the central timing unit and the other delay register stores the vertical processing delay provided by the central timing unit. The corresponding horizontal and vertical delay counters load the stored horizontal and vertical processing delays upon detecting the respective load pulses for the horizontal and vertical timing components, and count down to zero. Upon reaching zero for the horizontal or the vertical timing component, the corresponding horizontal or vertical delay counter generates a carry output for the horizontal or vertical timing component for the horizontal or vertical output counter and recommences counting down from the maximum count of the horizontal or vertical timing component. The corresponding horizontal and vertical output counters count from zero to the corresponding maximums for the horizontal and vertical timing components upon receiving the carry output from the corresponding horizontal and vertical delay counters. Upon reaching the maximum of the horizontal or the vertical timing component, the corresponding horizontal or vertical output counter and recommences counting from zero.

Shown in FIG. 5 is another modified programmable timing delay unit 28'' for an input synchronizer unit. The signal processing circuits for the input synchronizer unit comprise a dual ported memory 50' and a sync separator circuit 52. The programmable timing delay unit 28'' comprises two offset register and counter pairs, 40a'' and 42a'', 40b'' and 42b'', two delay registers, 44a'' and 44b'', and two input counters, 54a and 54b. The offset counters, 42a'' and 42b'', are coupled to the dual ported memory 50', the delay registers, 44a'' and 44b'', the offset registers, 40a'' and 40b'', and the reference interface 36. The offset registers, 40a'' and 40b'', are in turn coupled to the data interface 38. The input counters, 54a and 54b, are coupled to the dual ported memory 50', the delay registers, 44a'' and 44b'', the sync separator circuit 52 and the reference interface 36. The delay registers, 44a'', and 44b'', are in turn coupled to the data interface 38.

The offset register and counter pairs, 40a'' and 42a'', 40b'' and 42b'', provide read addresses to the dual ported memory 50' with the appropriate timing advances. The offset register and counter pairs, 40a'' and 42a'', 40b'' and 42b'', operates in the same manner as previously described for the basic programmable timing unit. In addition, the carry outputs of the offset counters, 42a'' and 42b'', are provided to the delay registers, 44a'' and 44b''.

The delay registers, 44a'' and 44b'', store processing delays of the input synchronizer derived from inputs provided by the sync separator circuit 52 of the input synchronizer. The delay registers, 44a'' and 44b'', store the output of the corresponding input counters, 54a and 54b, upon detection of the corresponding carry output from the corresponding offset counters, 42a'' and 42b''. The input counter 54a deals with the first timing component; the input counter 54b deals with the second timing component. In addition, the input counters, 54a and 54b, provide the write address for the dual ported memory 50'. The corresponding input counters, 54a and 54b, count up to the maximum of their respective timing components upon detecting the corresponding load pulses for their respective timing components.

For example, for a video system generating output signal in reference to a composite signal having a horizontal and a vertical timing component, the corresponding horizontal and vertical input counters count from zero to the corresponding maximums for the horizontal and vertical timing components upon detecting the load pulses for the horizontal and vertical timing components. Upon reaching the maximum of the horizontal or the vertical timing component, the corresponding horizontal or vertical input counter generates a carry output for the horizontal or vertical timing component for the dual ported memory and the horizontal or vertical delay register, and recommences counting from zero.

Figure 6:
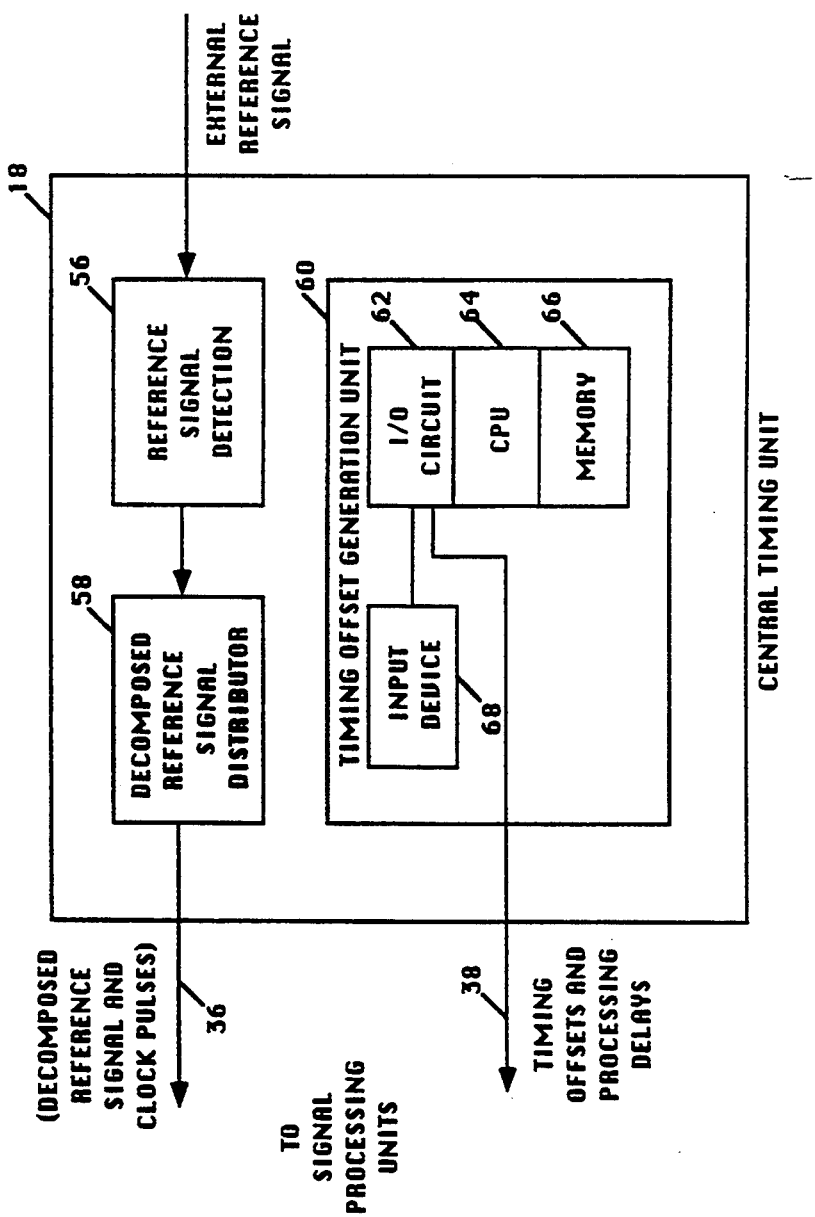
FIG. 6 shows a component view of the central timing unit of the present invention.

Referring now FIG. 6, a block diagram illustrating the central timing unit of the present invention is shown. Shown is the central timing unit 18 comprising a reference signal detector 56, a decomposed reference signal distributor 58, and a timing offset generation unit 60. The decomposed reference signal distributor 58 is coupled to the reference signal detector 56 and the reference signal interface 36. The timing offset generation unit is coupled to the data interface 38.

The reference signal detector 56 detects the external reference signal, processes the external reference signal to delineate the timing components, and outputs the decomposed reference signal to the decomposed reference signal distributor 58. In response, the decomposed reference signal distributor 58 distributes the decomposed reference signal and clock pulses to the signal processing units through the reference interface 36. The reference signal detector 56 and the decomposed reference signal distributor 58 are intended to represent a broad category of composite reference signal detectors and distributors, and will not be described further.

The timing offset generation unit 60 generates the timing offsets of the various timing components of the reference signal. The timing offset generation unit 60 generates the timing offsets of the various timing components based on the reference signal, the signal path and the processing delays of the various timing components of the signal processing units involved. Additionally, if the signal path comprises a signal synchronizer unit or an input synchronizer unit, the timing offset generation unit 60 further determines the processing delays of the various timing components of the signal synchronizer or the input synchronizer before determining the timing offsets of the various timing components for the signal processing units involved.

The timing offset generation unit 60 comprises input/output (I/O) circuit 62, a central processing unit (CPU) 64, memory 66, and an input device 68. The CPU 64 is coupled to the I/O circuit 62 and the memory 66. The I/O circuit 62 in turn is coupled to the input device 68 and the data interface 38. Except for the method employed for determining timing offsets for the various timing components, the timing offset generation unit 60 is intended to represent a broad category of well known general purpose computers, and will not be described further.

Figure 7:
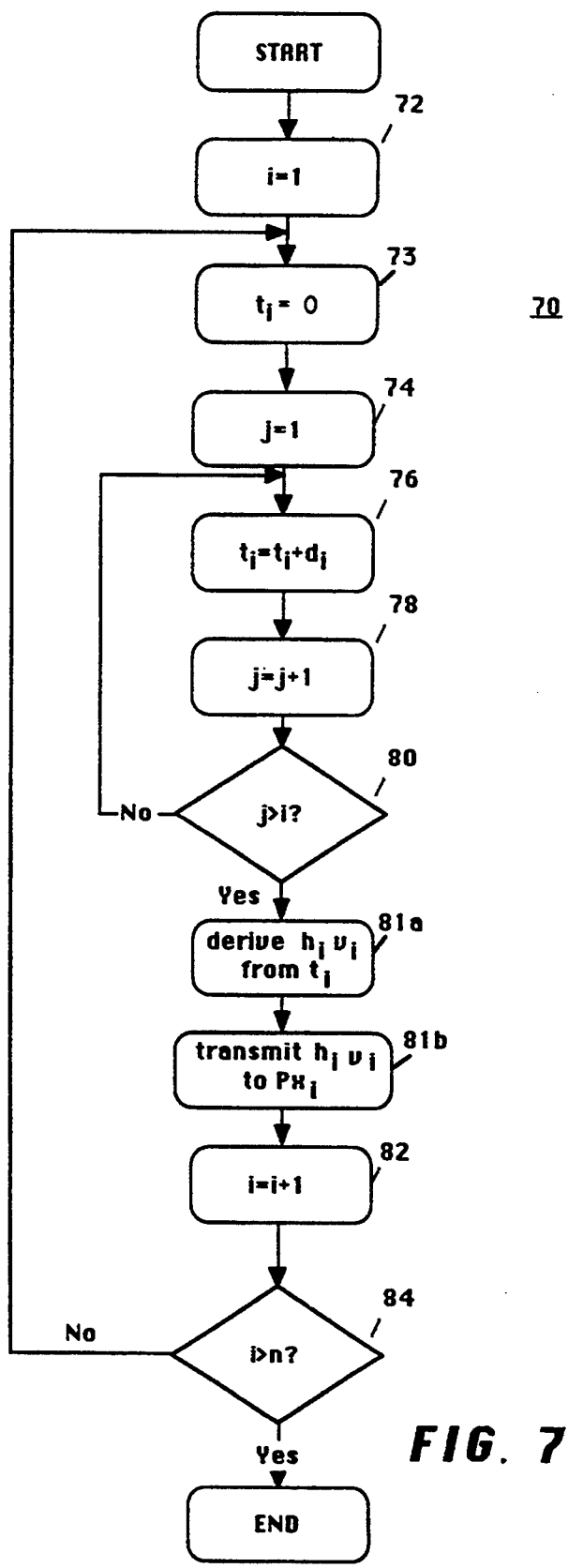
FIG. 7 shows a flow diagram of one embodiment of the method employed by the timing offset generation unit of the central timing unit of the present invention for generating timing offsets when the signal processing units of a signal path do not include a signal synchronizer unit or an input synchronizer unit.
Figure 8:
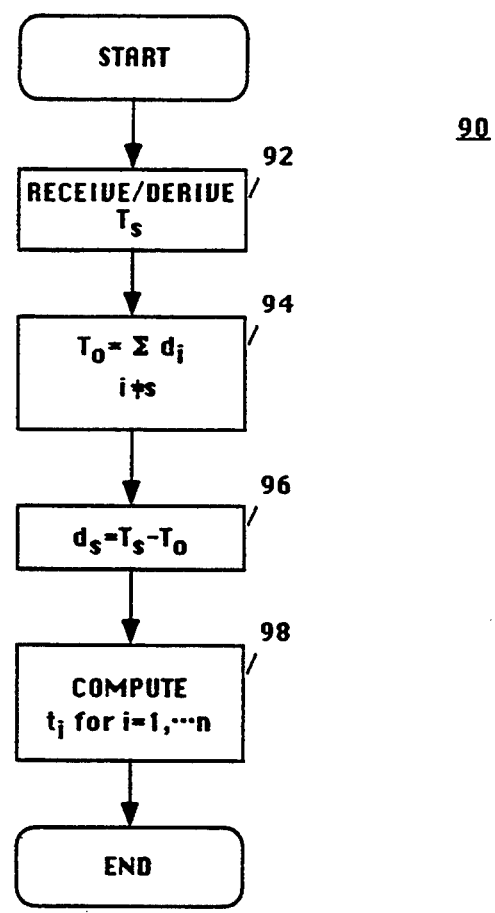
FIG. 8 shows a flow diagram of one embodiment of the method employed by the timing offset generation unit of the central timing unit of the present invention for generating timing offsets when the signal processing units of a signal path include a signal synchronizer unit.
Figure 9:
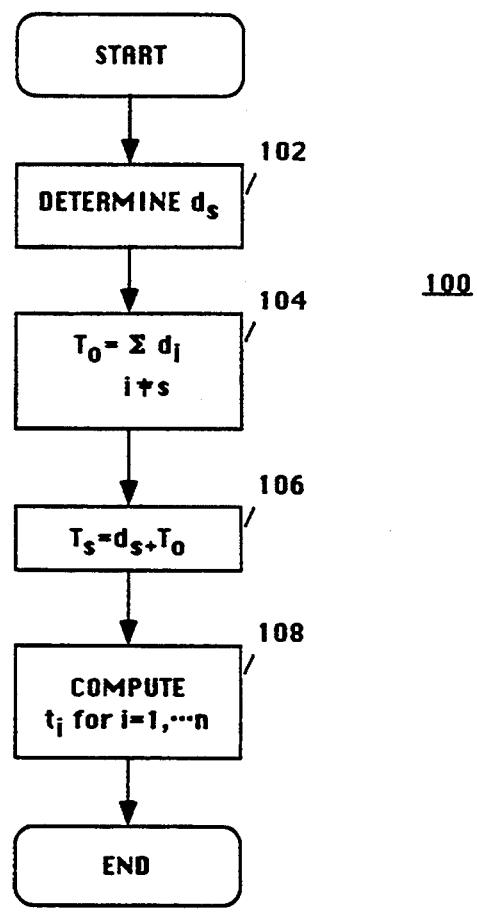
FIG. 9 shows a flow diagram of one embodiment of the method employed by the timing offset generation unit of the central timing unit of the present invention for generating timing offsets when the signal processing units of a signal path include an input synchronizer unit.

Referring now to FIGS. 7-9, three block diagrams illustrating the method employed by the timing offset generation unit of the present invention for determining timing offsets are shown. Let the individual signal processing units of a digital signal processing system be referred to as $P_x$, where x represents the address of a particular signal processing unit and is not ordered. Let the selection and ordering of the signal processing units for a given configuration be $P_i$, where i is the index of the signal processing unit in the signal path, and ranges from 1 to n, where 1 and n refer to the last and first signal processing unit in the signal path respectively. There exists a translation $x_i$ for mapping the address to the order of a signal processing unit in the signal path.

Additionally, each $P_i$ has an internal processing delay of $d_i$, where $d_i$ may be inherent, due to the construction or process of the signal processing unit, or programmable, as in the case of the signal synchronizer unit. For the programmable case, $d_i$ comprises $d_ip$ and $d_if$, where $d_ip$ is the programmable part and $d_if$ is the fixed part. $d_if$ is normally expected to be small. For a digital video system, $d_i$ is measured in units of pixels.

Furthermore, let $t_i$ be the total timing offset for all timing components of signal processing unit $P_i$, $t_i$ can be derived by summing $d_j$ for all $P_j$ where j is less than or equal to i. The relationship between the total timing offset and the timing offsets of the various timing components is application dependent. For a video system embodying the present invention, the total timing offset $t_i$ is also measured in pixels, and the total timing offset $t_i$ is converted into the horizontal timing component of $h_i$ pixels of horizontal shift, the vertical timing component of $v_i$ lines of vertical shift, and the frame timing component of $f_i$ frames of frame shift as follows:

$h_i = t_i \bmod h_{max}$ $v_i = (t_i \text{ div } h_{max}) \bmod v_{max}$ $f_i = (t_i \text{ div } v_{max}) \text{ rood } f_{max}$ where $h_{max}$, $v_{max}$ and $f_{max}$ are, 858, 525 and 2 for NTSC, 864, 625 and 4 for PAL, and 2200, 1125 and 1 for SMPTE 240M.

It will be appreciated that $f_{max}$ equals 2, 4, and 1 for NTSC, PAL and SMPTE 240M respectively because they are the natural color frame encoding sequence for these standards. It will further be appreciated that $f_i$ may not even be present for some video applications.

Shown in FIG. 7 is one embodiment of the method employed by the timing offset generation unit for generating timing offsets for a signal path having no signal synchronizer or input synchronizer. As described earlier, the timing offset $t_i$ for a signal processing unit can be derived by summing the processing delays $d_j$ for all successor signal processing units, i.e. $P_j$ where j is less than or equal to i.

The timing offset generation unit starts with the last signal processing unit (i=1), block 72, set $t_i$ to zero, block 73, and accumulates the processing delays of itself and all successor signal processing units, if any, from last to first, blocks 74–80. Upon determining $t_i$, the timing offset generator unit computes $h_i$ and $V_i$ as described earlier, block 81a, and transmits the computed $h_i$ and $V_i$ to $P_{xi}$, block 81b. The timing offset generation unit repeats the initialization step, block 73, the repetitive process of blocks 74–80, and the post generation steps, blocks 81a and 81b, for each predecessor signal processing unit from last to first, blocks 82 and 84. It will be appreciated that accumulation of processing delays of the successor signal processing units may be made in other manners.

Shown in FIG. 8 is one embodiment of the method employed by the timing offset generation unit for generating timing offsets for a signal path having a signal synchronizer. Initially, the timing offset generation unit receives the total system delay $T_s$ from an external knowledgeable source, block 92, for example, a user through the input device. The timing offset generation unit then computes the minimum total system delay $T_0$ by assuming the processing delay (programmable+fixed) of the signal synchronizer $d_s$ to be zero and accumulating the processing delays for all other signal processing units in the signal path, block 94. Upon computing $T_0$, the timing offset generation unit derives the processing delay (programmable+fixed) of the signal synchronizer $d_s$ by subtracting $T_0$ from $T_s$, block 96. Then, the timing offset generation unit generates the timing offsets for all signal processing units in the signal path as described earlier for a signal path with no signal synchronizer or input synchronizer, block 98.

Shown in FIG. 9 is one embodiment of the method employed by the timing offset generation unit for generating timing offsets for a signal path having an input synchronizer. Initially, the timing offset generation unit determines the processing delay $d_s$ of the input synchronizer (which is normally the first signal processing unit of a signal path), block 102. The timing offset generation unit determines the processing delay $d_s$ of the input synchronizer based on the processing delays of the various timing components read from the delay registers of the programmable timing delay unit of the input synchronizer. Similarly, the timing offset generation unit then computes the minimum total system delay $T_0$ by assuming the processing delay (programmable+fixed) of the input synchronizer $d_s$ to be zero and accumulating the processing delays for all other signal processing units in the signal path, block 104. Upon computing $T_0$, the timing offset generation unit computes the total system delay $T_s$ by adding the processing delay $d_s$ of the input synchronizer to $T_0$, block 106. Then, the timing offset generation unit generates the timing offsets for all signal processing units in the signal path as described earlier for a signal path with no signal synchronizer or input synchronizer, block 108.

Figure 10:
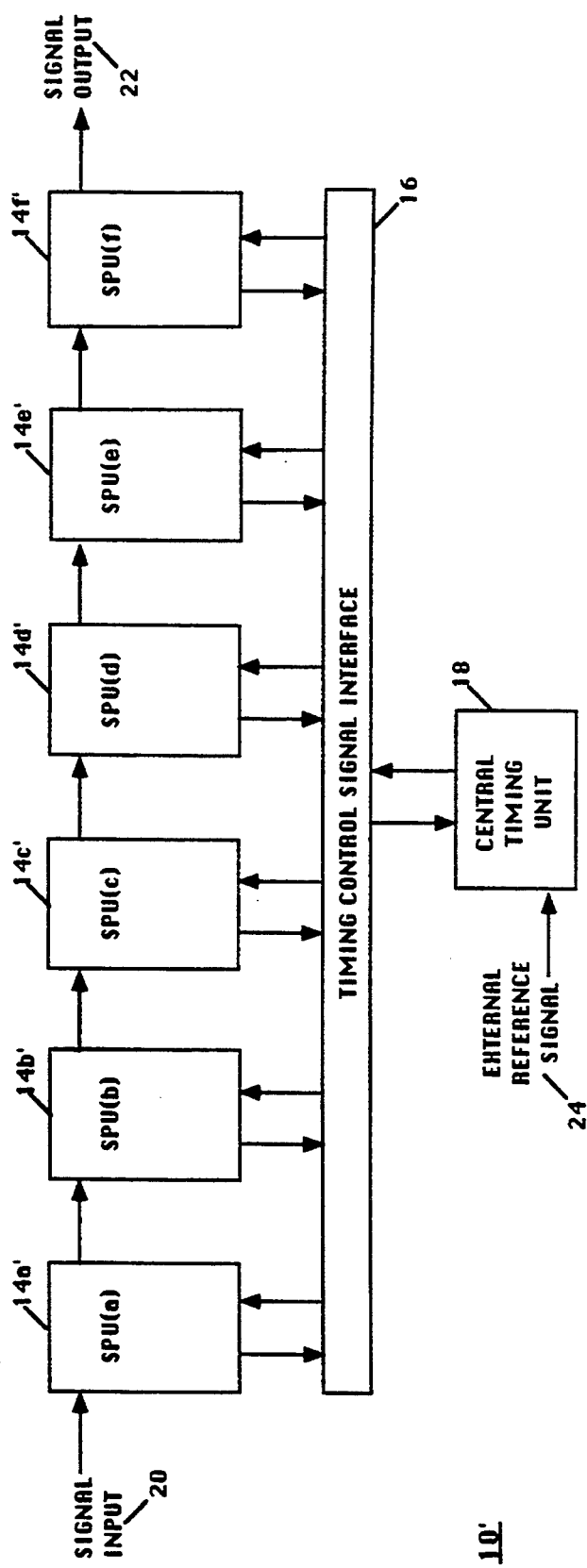
FIG. 10 shows a system view of a particular signal path configuration of the digital signal processing system illustrated in FIG. 1.
Figure 11:
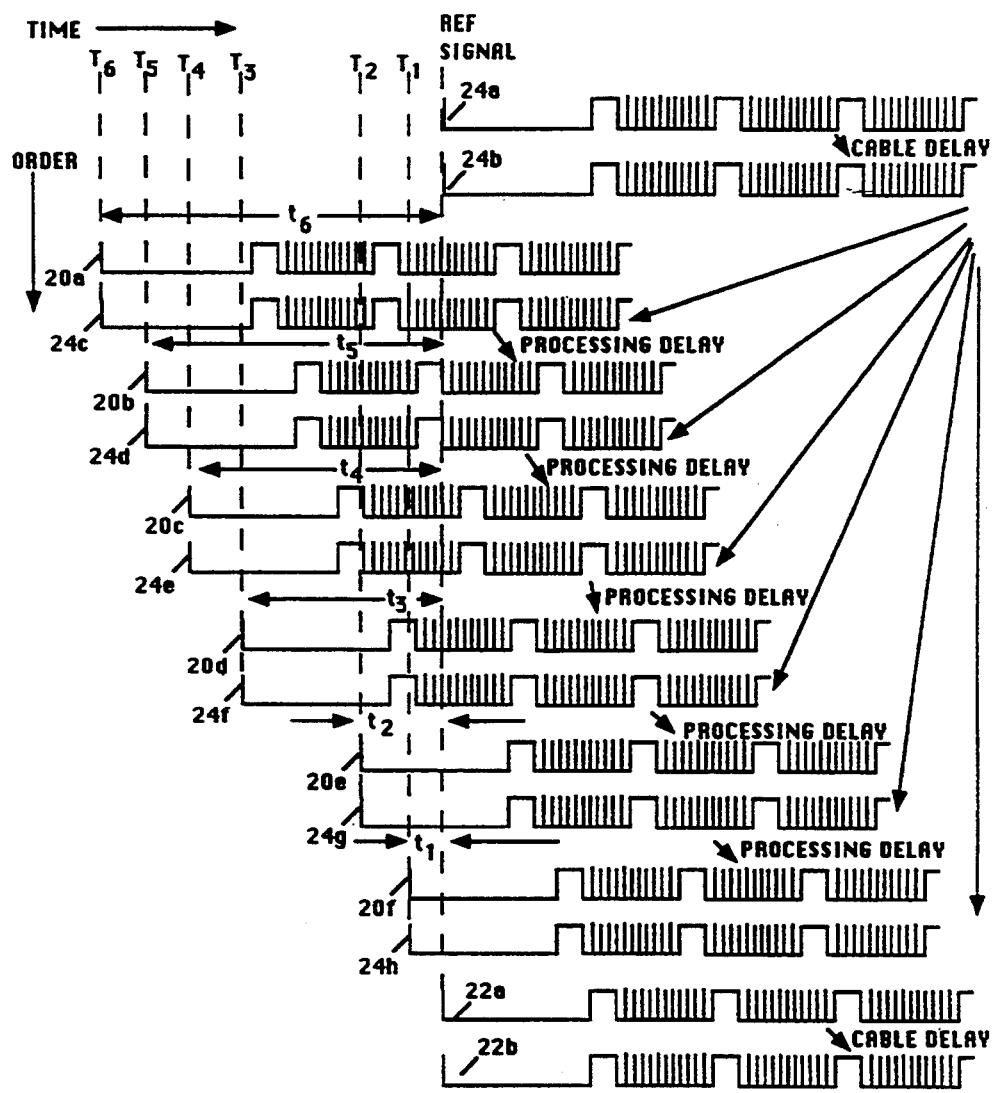
FIG. 11 illustrates the propagation and processing of the digital signal and the distribution of the composite reference signal for the particular signal path configuration of the digital signal processing system illustrated in FIG. 10.

Referring now to FIGS. 10 and 11, a block diagram and a timing diagram illustrating the propagation and processing of the input signal for a particular signal path to generate the output signal with the required timing relationship to the external reference is shown. Shown in FIG. 10 is an exemplary configuration of the digital signal processing system 10' comprising six ordered signal processing units, a through f, 14a'–14f'. As described earlier, the input signal 20 is propagated and processed by the signal processing units 14a'–14f' in accordance with the timing control inputs provided by the central timing unit 18 through the timing control signal interface 16. While the signal is shown being propagated from one signal processing unit to another to illustrate the order of these signal processing units 14a'–14f', it will be appreciated that the signal is actually propagated through the signal routing switcher described earlier.

Shown in FIG. 11 is the output signal 22b arriving at the signal destination in a fixed, predetermined timing relationship to the external reference signal 24a. To achieve the desired result, the cable delayed external reference signal 24b is distributed by the central timing unit to the six signal processing units in conjunction with the generated timing offsets $t_6$- $T_1$ respectively, thereby causing the programmable timing delay units to advance the signal timings of the signal processing units, as represented by regenerated reference signals 24c–24h, and start their corresponding processings of the input signal to $T_6$- $T_1$ respectively, as represented by the in process input signal 20a–20f. The timing offsets $t_6$ - $t_1$ provided in conjunction with the distributed reference signal 24b also factors into consideration the cable delay between the last signal processing unit and the ultimate signal destination, as represented by the timing difference between the initial output signal 22a and the ultimate output signal 22b.

While the present invention has been described in terms of presently preferred and alternate embodiments, those skilled in the art will recognize that the invention is not limited to the embodiments described. The present invention can be practiced with modification and alteration within the spirit and scope of the appended claims. The description is thus to be regarded as illustrative instead of limiting on the present invention. spirit and scope of the appended claims. The description is thus to be regarded as illustrative instead of limiting on the present invention.

What is claimed is:

1. In a signal processing unit of a digital signal processing system comprising signal processing circuits, a method for advancing and controlling signal timing of said signal processing circuits, said method comprising the steps of:
   a) receiving a reference signal from an external source, said reference signal comprising at least one timing component;
   b) generating a plurality of clock pulses and at least one timing offset;
   c) detecting a load signal corresponding to said at least one timing component within said reference signal;
   d) counting a number of said plurality of clock pulses after detecting said load signal; and
   e) providing a timing signal to at least one of said signal processing circuits when the number of said counted clock pulses reaches a limit that is a derived by a function of at least one timing offset.

2. The method as set forth in claim 1, wherein, said method further comprises the step of:
   f) storing at least one processing delay value, said at least one processing delay value comprising one processing delay value for said at least one timing component, said at least one processing delay value indicating a processing delay incurred by said signal processing circuits, said at least one processing delay value being provided to said signal processing circuits.

3. The method as set forth in claim 1, wherein, said method further comprises the steps of:
   f) storing at least one processing delay value, said at least one processing delay value comprising one processing delay value for said at least one timing component, said at least one processing delay value indicating a processing delay incurred by said signal processing circuits, said at least one processing delay value being stored by said signal processing circuits and provided to a central timing unit.

4. The method as set forth in claim 1, wherein, said signal processing unit is a signal synchronizer comprising a dual ported memory, and method further comprises the steps of:
   f) receiving at least one processing delay value, said at least one processing delay value comprising one processing delay value for said timing component, said at least one processing delay value indicating a processing delay incurred by said signal processing circuits, said at least one processing delay value provided to said signal processing circuits;
   g) generating a plurality of first carry outputs using said reference signal, said clock pulses, and said at least one processing delay value, said generated plurality of first carry outputs comprising a plurality of first carry outputs for said timing component; and
   h) generating a plurality of second outputs for said dual ported memory using said clock pulses and said plurality of first carry outputs, said plurality of second outputs comprising a plurality of second outputs for said at least one timing component, said plurality of second outputs forming read addresses for said dual ported memory with timing advances;
   said timing signal forming write addresses for said dual ported memory with timing advances.

5. The method as set forth in claim 1, wherein, said signal processing unit is an input synchronizer comprising a dual ported memory and a sync separator circuit, and said method further comprises the steps of:
   f) receiving in a counter at least one input pulse from said sync separator circuit, said at least one input pulse comprising one input pulse for each said timing component;
   g) generating a plurality of first outputs for said dual ported memory using said clock pulses and said at least one input pulse, said plurality of first outputs comprising a plurality of first outputs for each said timing component, said plurality of first outputs forming write addresses for said dual ported memory with timing advances;
   said timing signal forming read addresses for said dual ported memory with timing advances.

6. The method as set forth in claim 5, wherein, said method further comprises the steps of:
   h) storing in said dual ported memory and said sync separator circuit said plurality of first outputs upon generation of said timing signal, said stored plurality of first outputs forming at least one processing delay value, said at least one processing delay value comprising one processing delay value for said timing component, said at least one processing delay value indicating processing delay incurred by said dual ported memory and said sync separator circuit, said at least one processing delay value being stored by said dual port memory and said sync separator circuit.

7. A programmable timing delay unit for advancing and controlling signal timing of signal processing circuits in a signal processing unit of a digital signal processing system, said signal processing system including a clock pulse generator, a timing offset generator and a receiver for receiving an external reference signal that includes a timing component, said programmable timing delay unit comprising:
   a) an offset register coupled to said timing offset generator; and
   b) a counter with a plurality of inputs and an output, said plurality of inputs coupled to said offset register to receive an timing offset number, said receiver and said clock pulse generator, said output coupled to a signal processing unit, said counter providing a signal over said output when a number of clock pulses, counted after receiving a load signal within said reference signal, equals a number that is derived by a function of said timing offset number.

8. The programmable timing delay unit as set forth in claim 7, wherein, said programmable timing delay unit further comprises:
   c) at least one delay register coupled to said signal processing circuits for storing at least one processing delay value, said at least one processing delay value determining said timing offset number;
   said at least one delay register comprising one delay register for each of said at least one timing component;
   said at least one processing delay value indicating a processing delay incurred by said signal processing circuits, said at least one processing delay value being used by said signal processing circuits to time signal processing.

9. The programmable timing delay unit as set forth in claim 7, wherein, said programmable timing delay unit further comprises:
   c) at least one delay register coupled to said signal processing circuits for storing at least one processing delay value, said at least one processing delay value determining said timing offset number;

said at least one delay register comprising one delay register for each of said at least one timing component;

said at least one processing delay value indicating a processing delay incurred by said signal processing circuits, said at least one processing delay value being stored by said signal processing circuits.

10. The programmable timing delay unit as set forth in claim 7, wherein, said signal processing unit is an input synchronizer comprising a dual ported memory and a sync separator circuit, and said programmable timing delay unit further comprises:

c) at least one input counter coupled to said dual ported memory, and said sync separator circuit for receiving at least one input pulse from said sync separator circuit, said clock pulses, and in response, generating a plurality of outputs for said dual ported memory, said plurality of outputs forming write addresses for said dual ported memory with appropriate timing advances, said at least one input counter comprising one input counter for each of said timing component;

said plurality of outputs being generated by said at least one offset register and counter pair forming write addresses for said dual ported memory with appropriate timing advances.

11. The programmable timing delay unit as set forth in claim 10, wherein, said programmable timing delay unit further comprises:

d) at least one delay register coupled to said at least one offset register and counter pair and said at least one input counter for storing said plurality of outputs generated by said at least one input counter upon receiving said plurality of carry outputs generated by said at least one offset register and counter pair;

said at least one delay register comprising one delay register for each of said timing component;

said stored plurality of outputs generated by said at least one input counter forming at least one processing delay value, said at least one processing delay value indicating processing delay incurred by said dual ported memory and said sync separator circuit, said at least one processing delay value being stored by said dual port memory and said sync separator circuit.

12. In a digital signal processing system comprising a plurality of cascaded signal processing units, wherein each of said cascaded signal processing units comprises signal processing circuits and programmable timing delay units, a method for providing timing control inputs to said programmable timing delay units to control signal timing of said signal processing circuits, such that an output signal can be generated with fixed, predetermined timing relationship to an external reference signal, said method comprising the steps of:

a) receiving said external reference signal;
   b) distributing said external reference signal along with a plurality of clock pulses to said programmable timing delay units;
   c) generating timing offsets for each of said programmable timing delay units; and
   d) distributing said generated timing offsets to said programmable timing delay units.

13. The method as set forth in claim 12, wherein,
said external reference signal is a composite reference signal comprising a plurality of timing components;
said step b) further comprises decomposing said composite reference signal into its timing components before distributing it to said programmable timing delay units;
said step c) comprises generating timing offsets of each of said timing components for each of said programmable timing delay units; and
said step d) comprises distributing said computed timing offsets of said timing components to said programmable timing delay units.

14. In a digital signal processing system comprising a plurality of cascaded signal processing units, wherein each of said cascaded signal processing units comprises signal processing circuits and programmable timing delay units, a central timing unit for providing timing control inputs to said programmable timing delay units to control signal timing of said signal processing circuits, such that an output signal can be generated with fixed, predetermined timing relationship to an external reference signal, said central timing unit comprising:

a) a reference signal detector and distributor pair for receiving said external reference signal and distributing said external reference signal along with a plurality of clock pulses to said programmable timing delay units; and
   b) a timing generation unit coupled to said programmable timing delay units comprising a processor for generating timing offsets for each of said programmable timing delay units, and distributing said generated timing offsets to said programmable timing delay units.

15. The central timing unit as set forth in claim 14, wherein,
said external reference signal is a composite reference signal comprising a plurality of timing components;
said reference signal detector and distributor pair decomposes said composite reference signal into its timing components before distributing it to said programmable timing delay units;
said timing generation unit generates timing offsets of each of said timing components for each of said programmable timing delay units; and
said timing generation unit further distributes said computed timing offsets of said timing components to said programmable timing delay units.

16. In a digital signal processing system comprising a plurality of cascaded signal processing units, a method for controlling signal timing of said cascaded signal processing units to generate an output signal with fixed, predetermined timing relationship to an external reference signal, said method comprising the steps of:

a) receiving said external reference signal by a central timing unit;
   b) distributing said external reference signal along with a plurality of clock pulses from said central timing unit to said cascaded signal processing units;
   c) generating timing offsets by said central timing unit for each of said cascaded signal processing units;
   d) distributing said generated timing offsets from said central timing unit to said cascaded signal processing units; and
   e) advancing and controlling signal timing of said cascaded signal processing units by counting a number of said clock pulses that is derived by a function of said timing offsets after receiving a load signal within said reference signal.

17. The method as set forth in claim 16, wherein, said external reference signal is a composite reference signal comprising a plurality of timing components;

said step b) further comprises decomposing said composite reference signal into its timing components before distributing it from said central timing unit to said cascaded signal processing units;

said step c) comprises generating timing offsets of each of said timing components for each of said cascaded signal processing units;

said step d) comprises distributing said computed timing offsets of said timing components to said cascaded signal processing units; and said step e) comprises using said distributed timing offsets of said timing components.

18. In a digital signal processing system comprising a plurality of cascaded signal processing units, an apparatus for controlling signal timing of said cascaded signal processing units to generate an output signal with fixed, predetermined timing relationship to an external reference signal, said apparatus comprising:

a) a plurality of programmable timing delay units, one for each of said cascaded signal processing units, for advancing and controlling signal timing of signal processing circuits of said cascaded signal processing units; and b) a central timing unit coupled to said programmable timing delays units comprising a reference signal detector and distributor pair for receiving said external reference signal and distributing said external reference signal along with clock pulses to said programmable timing delay units, and a timing offset generation unit for generating timing offsets for said signal processing circuits of said signal processing units and distributing said generated timing offsets to said programmable timing delay units, said programmable timing delay units advance and control signal timing of said signal processing circuits of said cascaded signal processing units by counting a number of said clock pulses that is derived by a function of said timing offsets after receiving a load signal within said reference signal.

19. The apparatus as set forth in claim 18, wherein, said external reference signal is a composite reference signal comprising a plurality of timing components;

said reference signal detector and distributor pair decomposes said composite reference signal into its timing components before distributing it from said central timing unit to said cascaded signal processing units;

said timing offset generation unit generates timing offsets of each of said timing components for each of said cascaded signal processing units, and distributes said generated timing offsets of said timing components to said cascaded signal processing units; and said programmable timing delay units use said distributed timing offsets of said timing components.

20. A digital signal processing system comprising:

a) a plurality of cascaded signal processing units for processing an input signal and generating an output signal in a fixed, predetermined timing relationship to an external reference signal; and b) a central timing unit coupled to said cascaded signal processing units for detecting said external reference signal, distributing said detected external reference signal along with clock pulses to said cascaded signal processing units, generating timing offset for each of said cascaded signal processing units, and distributing said generated timing offsets to said cascaded signal processing units, said output signal being generated with said required timing relationship using said distributed reference signal, clock pulses and said timing offsets by counting a number of said clock pulses that is derived by a function of said timing offsets after receiving a load signal within said reference signal.

21. The digital signal processing system as set forth in claim 20, wherein, each of said cascaded signal processing units comprises:

a.1) signal processing circuits for processing said input signal and generating said output signal with said required timing relationship; and a.2) a programmable timing delay unit coupled to said signal processing circuits and said central timing unit for receiving said reference signal, said clock pulses and said timing offsets and using said received reference signal, clock pulses and timing offsets for advancing and controlling signal timing of said signal processing circuits by counting a number of said clock pulses that is derived by a function of said timing offsets after receiving a load signal within said reference signal.

22. The digital signal processing system as set forth in 20, wherein, said central timing unit comprises:

b.1) a reference signal detector and distributor pair coupled to said programmable timing delay units for detecting an external reference signal and distributing said detected external reference signal along with clock pulses to said programmable timing delay units; and b.2) a timing generation unit coupled to said programmable timing delay units for generating said timing offsets and distributing said generated timing offsets to said programmable delay timing units.

* * * * *